(12) United States Patent
Zhang et al.

(10) Patent No.: US 9,898,329 B1
(45) Date of Patent: Feb. 20, 2018

(54) FLEXIBLE PROCESSOR ASSOCIATION FOR VIRTUAL MACHINES

(71) Applicant: Google Inc., Mountain View, CA (US)

(72) Inventors: Xiao Zhang, San Jose, CA (US); Xiaopan Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/202,212

(22) Filed: Jul. 5, 2016

Related U.S. Application Data (63) Continuation of application No. 14/514,604, filed on Oct. 15, 2014, now Pat. No. 9,389,894.

(51) Int. Cl.
*G06F 9/45* (2006.01)
*G06F 9/455* (2018.01)

(52) U.S. Cl.
CPC .. *G06F 9/45558* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| | | |
|---|---|---|
| 2013/0332778 A1 | 12/2013 | Spracklen |
| 2015/0178115 A1* | 6/2015 | Shiva .................. H04L 12/4641 718/1 |

OTHER PUBLICATIONS

Snover, "Windows Server "8" Beta: Hyper-V & Scale-up Virtual Machines Part 1 . . . ," Windows Server Blog, Apr. 5, 2012 [retrieved on Sep. 19, 2014]. Retrieved from the Internet: URL<http://blogs.technet.com/b/windowsserver/archive/2012/04/05/windows-server-8-beta-hyper-v-amp-scale-up-virtual-machines-part-l.aspx>, 8 pages.

Unknown Author, "Allocation Models," VMware.com, publically available before Oct. 15, 2014. Retrieved on Sep. 19, 2014, retrieved from the Internet: URL<http://download3.vmware.com/vcat/vcat31_documentation_center/index.html#page/Architecting%20a%20vCloud/3a%20Architecting%20a%20VMwar%E2%80%A6?, 2 pages.

Unknown Author, "Amazon Elastic Compute Cloud," User Guide, Amazon Web Services, Jun. 15, 2014, 703 pages.

(Continued)

*Primary Examiner* — Chuck Kendall
(74) *Attorney, Agent, or Firm* — Fish & Richardson P.C.

(57) ABSTRACT

The present disclosure relates to flexible processor association for virtual machine instances. One example method includes initializing a virtual machine instance on a particular computing device, the particular computing device including a plurality of physical processors, determining a maximum number of the physical processors available to be associated with the virtual machine instance; initializing a number of virtual processors for use by the virtual machine instance, the same as the maximum number of the physical processors; associating the virtual machine instance with a number of the physical processors less than the maximum number of the physical processors; during execution of the virtual machine instance: identifying a change in a demand metric associated with the virtual machine instance; and adjusting the number of the physical processors associated with the virtual machine instance based on the identified change in the demand metric while maintaining the number of virtual processors.

20 Claims, 6 Drawing Sheets

(56) References Cited

OTHER PUBLICATIONS

Unknown Author, "Hyper-V Support for Scaling Up and Scaling Out Overview," TechNet, Feb. 29, 2012 [retrieved on Sep. 19, 2014]. Retrieved from the Internet: URL<http://technet.microsoft.com/en-us/library/hh831389.aspx>, 2 pages.

Unknown Author, "VMware vSphere 4—ESX and vCenter Server," VMware.com, publically available before Oct. 15, 2014. Retrieved on Sep. 19, 2014, retrieved from the Internet: URL<http://pubs.vmware.com/vsphere-4-esx-vcenter/index.jsp?topic=/com.vmware.vsphere.vmadmin.doc_41/vsp_vm_guide/configuring_virtual_machines/t%E2%80%A6>, 2 pages.

* cited by examiner

FLEXIBLE PROCESSOR ASSOCIATION FOR VIRTUAL MACHINES

CROSS-REFERENCE TO RELATED APPLICATION

This application is a continuation of U.S. application Ser. No. 14/514,604, filed Oct. 15, 2014, the contents of which are incorporated herein by reference.

BACKGROUND

Computing devices may contain multiple physical processors (e.g., central processing units (CPUs)) for processing instructions included in software applications. Operating systems, generally, include functionality to associate a particular software application with one or more physical processors such that an instruction issued by the particular software will be executed by one of the associated physical processors.

Computing devices may include virtual machines, which are software applications that that execute other software applications by presenting them with virtual models of physical computing resources, such as, for example, processors, memory, and other resources.

SUMMARY

The present disclosure relates to flexible processor association for virtual machine instances.

In general, one innovative aspect of the subject matter described in this specification can be embodied in methods that include the actions of initializing a virtual machine instance on a particular computing device, the particular computing device including a plurality of physical processors; determining a maximum number of the physical processors available to be associated with the virtual machine instance to execute instructions provided by the virtual instance; initializing a number of virtual processors for use by the virtual machine instance, wherein the number of virtual processors initialized is the same as the maximum number of the physical processors available to be associated to the virtual machine instance, and wherein each virtual processor is configured to receive instructions for execution from the virtual machine instance and execute the received instructions using the physical processors associated with the virtual instance; associating the virtual machine instance with a number of the physical processors, the number being less than the maximum number of the physical processors available to be associated to the virtual machine instance; executing the virtual machine instance on the particular computing device; during execution of the virtual machine instance: identifying a change in a demand metric associated with the virtual machine instance, the demand metric indicating a prediction of future usage of the physical processors by the virtual machine instance; and adjusting the number of the physical processors associated with the virtual machine instance based on the identified change in the demand metric while maintaining the number of virtual processors.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By changing the number of physical processors associated to virtual machine instances without changing the number of virtual processors presented to software applications by the virtual machine instance, processing capacity may be scaled up or down without affecting software applications executing in the virtual machine instance. Further, by monitoring metrics of the virtual processors, the number of physical processors associated to a virtual machine instance can be adjusted based on predicted demand for processing resources. Such an approach may lead to more efficient and agile association of physical processors versus techniques that measure physical processor usage rather than predict future demand, which may allow physical processors to be over-subscribed due to the ability of the system to quickly adjust to demand changes.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

In virtual computing environments, software applications executed by virtual machine instances may be shielded from physical hardware by the virtual machine instances. For example, a virtual machine instance may present multiple virtual processors to an executing software application. The software application interacts with these virtual processors as it would with a physical processor by issuing instructions for execution to the virtual processors and receiving instruction results in response. The virtual processors issue instructions received from the software application to the physical processors of the computing device running the virtual machine instance. In some cases, it may be advantageous to associate the physical processors of the computing device to different virtual machine instances such that instances that generate large amounts of load have more physical processors associated than instances that generate less processing load. However, changing the association of physical processors, or the number of virtual processors for a given virtual machine instance, may disrupt execution of software applications that are not designed to handle such a change.

Accordingly, the present disclosure describes techniques for flexible physical processor association for virtual machine instances. One example method includes initializing a virtual machine instance on a particular computing device including multiple physical processors. A maximum number of the physical processors may be designated as available to be associated with the virtual machine instance to execute instructions it provides. A virtual processor is then associated for each of the maximum number of physical processors. The virtual machine instance is then associated an initial number of the physical processors (less than the maximum value). The virtual machine instance is then executed on the particular computing device. While the virtual machine instance is executing, metrics associated with the virtual processors are monitored to predict demand, which represents a prediction of future usage of the associated to the virtual machine instance. If a change in the demand for the virtual machine instance occurs, the number of physical processors associated with the virtual machine instance may be adjusted to accommodate the demand. For example, if the change in demand indicates that demand is increasing, more physical processors may be associated with the virtual machine instance. If the change in demand indicates that demand is decreasing, physical processors may be disassociated from the virtual machine instance. The amount of change in demand that will result in change in the number of processors associated may be pre-configured such that only changes of certain magnitudes will result in a change in association. Because the number of virtual processors is kept constant during execution, changes in physical processor association will be transparent to software applications executed by the virtual machine instance.

Figure 1:
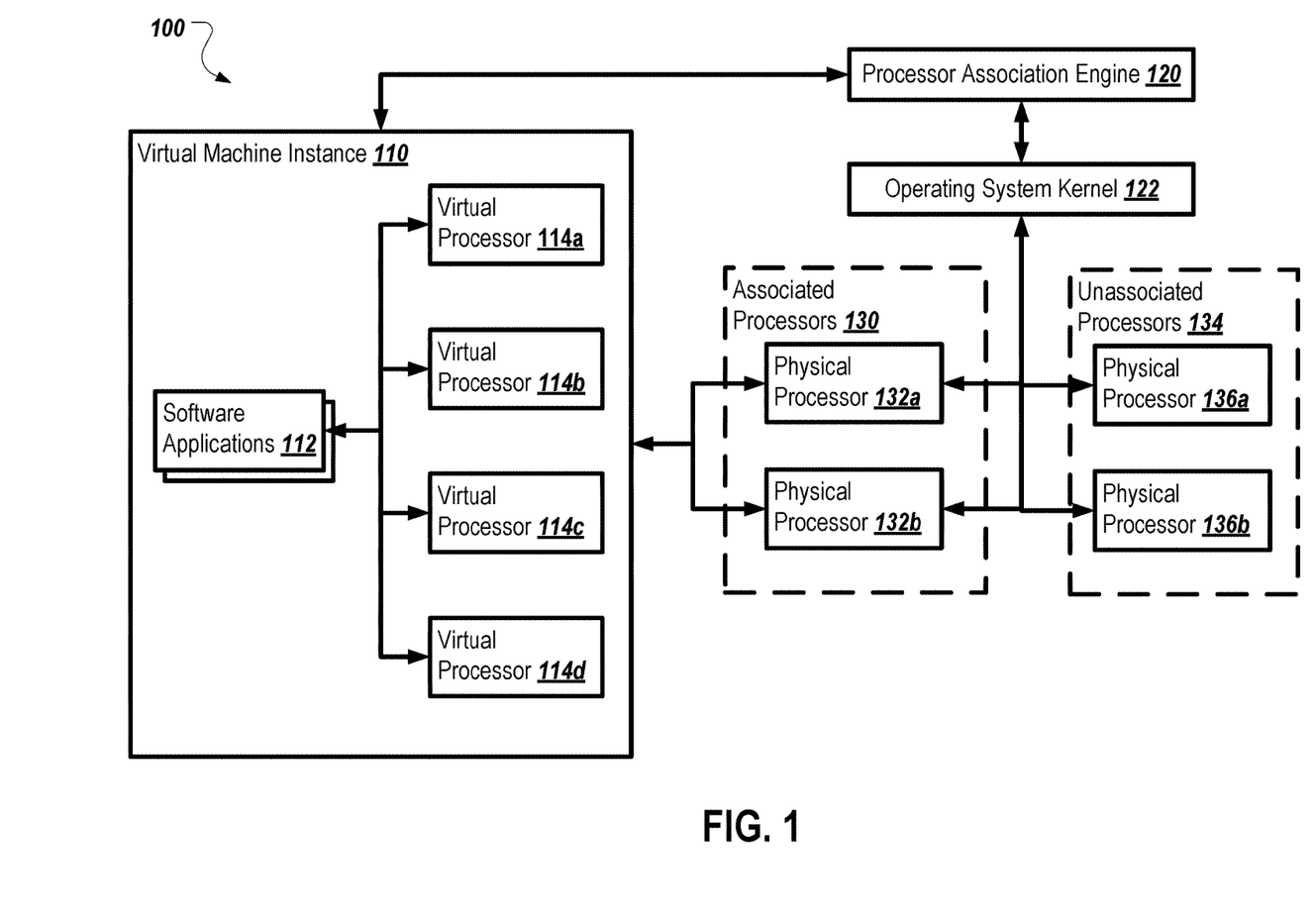
FIG. 1 is a block diagram of an environment in which flexible physical processor association for virtual machine instances can occur.

FIG. 1 is a block diagram of an environment 100 in which flexible physical processor association for virtual machine instances can occur. The environment 100 includes a virtual machine instance 110 executing on a set of associated processors 130. The environment 100 also includes a set of unassociated processors 134 on which the virtual machine instance 110 is not configured to execute. An operating system kernel 122 controls execution of physical processors 132a-b and 136a-b. A processor association engine 120 interacts with the operating system kernel 122. In operation, one or more software applications 112 are executed within the virtual machine instance 110 by virtual processors 114a-d. Software applications 112 issue instructions to the virtual processors 114a-d. These instructions are then sent to the associated processors 130 for execution, and execution results returned by the associated processors 130 returned to the software applications 112 by the virtual processors 114a-d. The processor association engine 120 monitors metrics associated with the virtual machine instance 110 to determine a demand associated with the virtual machine instance 110 for the associated processors 130. For example, the processor association engine 120 may monitor various performance metric associated with the virtual processors 114a-d, such as the length of a run queue associated with each of the virtual processors 114a-d indicating a number of threads waiting to be executed by the associated processors 130, or the number of instructions queued on virtual processors waiting to be executed by associated processors 130. Using this information, the processor association engine 120 may identify changes in the demand associated with the virtual machine instance 110. In response to such a change, the processor association engine 120 may interact the operating system kernel 122 to change which of the physical processors 132a-b and 136a-b are associated with the virtual machine instance 110. For example, if the processor association engine 120 detects increasing demand from the virtual machine instance 110, the processor association engine 120 may instruct the operating system kernel 122 to add the physical processor 136a to the set of associated processors for the virtual machine instance 110. In such a case, three physical processors will then be associated with virtual machine instance 110 and thus available to process instructions from the virtual machine instance 110. Having more physical processors available to execute instructions may lead to better performance for the software applications 112, as instructions will be less likely to be delayed waiting for one of the associated processors 130 to become available.

The environment 100 includes a virtual machine instance 110. The virtual machine instance 110 is operable to execute the software applications 112 by providing virtual representations of physical computing resources, such as the virtual processors 114a-d. In some cases, the virtual machine instance 110 may be executed inside a virtual machine environment. In some cases, execution of the virtual machine instance 110 may be managed by a hypervisor or other management component. In some cases, the virtual machine environment may instantiate the virtual machine instance 110 in response to perceived instructions, such as through an Application Programming Interface (API). In some implementations, the virtual machine instance 110 is itself a software application executed by the operating system kernel 122. The virtual machine instance 110 may also be a kernel level process executing alongside the operating system kernel 122.

The virtual machine instance 110 includes virtual processors 114a-d. The virtual processors 114a-d are operable to receive instructions for execution from the software applications 112. In some cases, the virtual processors 114a-d may be operable to convert the instructions received from the software applications 112 into an instruction format associated with the physical processors 132a-b and 136a-b. The virtual processors 114a-d may also be operable to queue instructions received from the software applications 112 in the event the associated processors 130 are not available to execute instructions. In some implementations, the virtual processors 114a-d may be separate threads of execution within the virtual machine instance 110. Virtual processors 114a-d may also be objects, modules, or other software structure's instantiated within the virtual machine instance 110. The operations of the virtual processors 114a-d or described in greater detail relative to FIG. 2.

The environment 100 also includes an operating system kernel 122. The operating system kernel 122 may be operable to manage the execution of the physical processors 132a-b and 136a-b. In some cases, the virtual machine instance 110 may interact the operating system kernel 122 to execute instructions on the physical processors 132a-b and 136a-b. The operating system kernel 122 may also execute other software applications besides the virtual machine instance 110. In some cases, the operating system kernel 122 may include an API or other mechanism for controlling which of the physical processors 132a-b and 136a-b are associated to particular software processes executed by the operating system kernel 122, such as the virtual machine instance 110. The operating system kernel 122 may manage the contents of the set of associated processors 130 in the set of unassociated processors 134. Each of these sets is specific to the virtual machine instance 110, and represents which physical processors are available to execute instructions issued by the virtual machine instance 110. In the example environment 100, physical processors 132a-b are available to execute instructions issued by the virtual machine instance 110, while physical processors 136*a-b* are not available to execute instructions issued by the virtual machine instance 110.

The environment 100 also includes the physical processors 132*a-b* and 136*a-b*. In some cases, the physical processors 132*a-b* and 136*a-b* may be physical CPUs within a computing device. In some cases, the physical processors 132*a-b* and 136*a-b* may be processor cores within one or more multi core CPUs. In some cases, the physical processors 132*a-b* and 136*a-b* may be included within one or more computing devices and may be connected to the operating system kernel 122 and the virtual machine instance 110 by communications network. The physical processors 132*a-b* and 136*a-b* may communicate with the other computing resources in order to execute received instructions, such as, for example, memories, network adapters, display devices, or other computing resources.

The environment 100 also includes a processor association engine 120. In operation, the processor association engine 120 monitors a virtual machine instance 110 and calculates a demand metric associated with the virtual machine instance 110 indicating predicted future usage of the physical processors 132*a-b* and 136*a-b*. For example, the processor association engine 120 may, at regular intervals, retrieve performance metrics from the virtual machine instance 110. In some cases, the performance metrics may be metrics associated with the virtual processors 114*a-d*, including, but not limited to, run queue length, load average, average instruction wait time, instruction throughput, or other metrics. In some implementations, the processor association engine 120 may receive regular updates from the virtual machine instance 110 including the performance metrics. The processor association engine 120 may also interact with the operating system kernel 122 to determine the performance metrics associated with the virtual machine instance 110.

The processor association engine 120 may store representation of a current demand metric associated with the virtual machine instance 110. In some cases, this demand metric may be a representation of the last calculated demand for the virtual machine instance 110. The demand metric may also be a running average of the demand associated with the virtual machine instance 110. In some implementations, the demand metric may include a snapshot of the demand for the virtual machine instance 110 over a certain period of time, such as, for example, the last five minutes of execution. In some cases, the demand metric may be a numerical value quantifying the calculated demand so that different calculations can be compared to one another to determine the magnitude of a change in demand.

In some implementations, the processor association engine 120 may use predetermined thresholds to determine whether a change in demand is of sufficient magnitude to warrant changing the association of processors to the virtual machine instance 110. For example, such a threshold may indicate that a change in the demand metric of greater than 10% should trigger a change in processor association. When the processor association engine 120 identifies that such a change in demand has occurred, the processor association engine 120 may interact with the operating system kernel 122 to change the set of associated processors 130. For example, the processor association engine 120 may change the CPU affinity bit mask associated with the virtual machine instance 110 to disassociate physical processor 132*a* from the virtual machine instance 110 in response to detecting a decrease in demand. In some implementations, the processor association engine 120 may interact with the operating system kernel 122 using API or other mechanism for changing the association a physical processors to the virtual machine instance 110.

The processor association engine 120 may be a module within the operating system kernel 122. The processor association engine 120 may also be a separate software process from the operating system kernel 122 executing at the same execution level as the operating system kernel 122 (e.g., the kernel level). The processor association engine 120 may also adjust the associations of the physical processors 132*a-b* and 136*a-b* to the virtual machine instance 110 based on a maximum and minimum number of physical processors that are to be associated with the virtual machine instance 110.

In some cases, the processor association engine 120 may adjust the set associated of associated processors 130 based on a service plan associated with the virtual machine instance 110. For example, an owner of the virtual machine instance 110 may indicate a desire for a certain minimum performance level for the virtual machine instance 110. The processor association engine 120 may associate physical processors as necessary to maintain the performance of the virtual machine instance 110 above this minimum level. In some cases, the processor association engine 120 may store records of each change to the set of associated processors 130. These records may be used to implement variable pricing based on the number of associated physical processors. For example, the owner of the virtual machine instance 110 may be charged a certain rate for times when two physical processors are associated with the virtual machine instance 110, and may be charged a higher rate when four physical processors are associated with the virtual machine instance 110.

Figure 2:
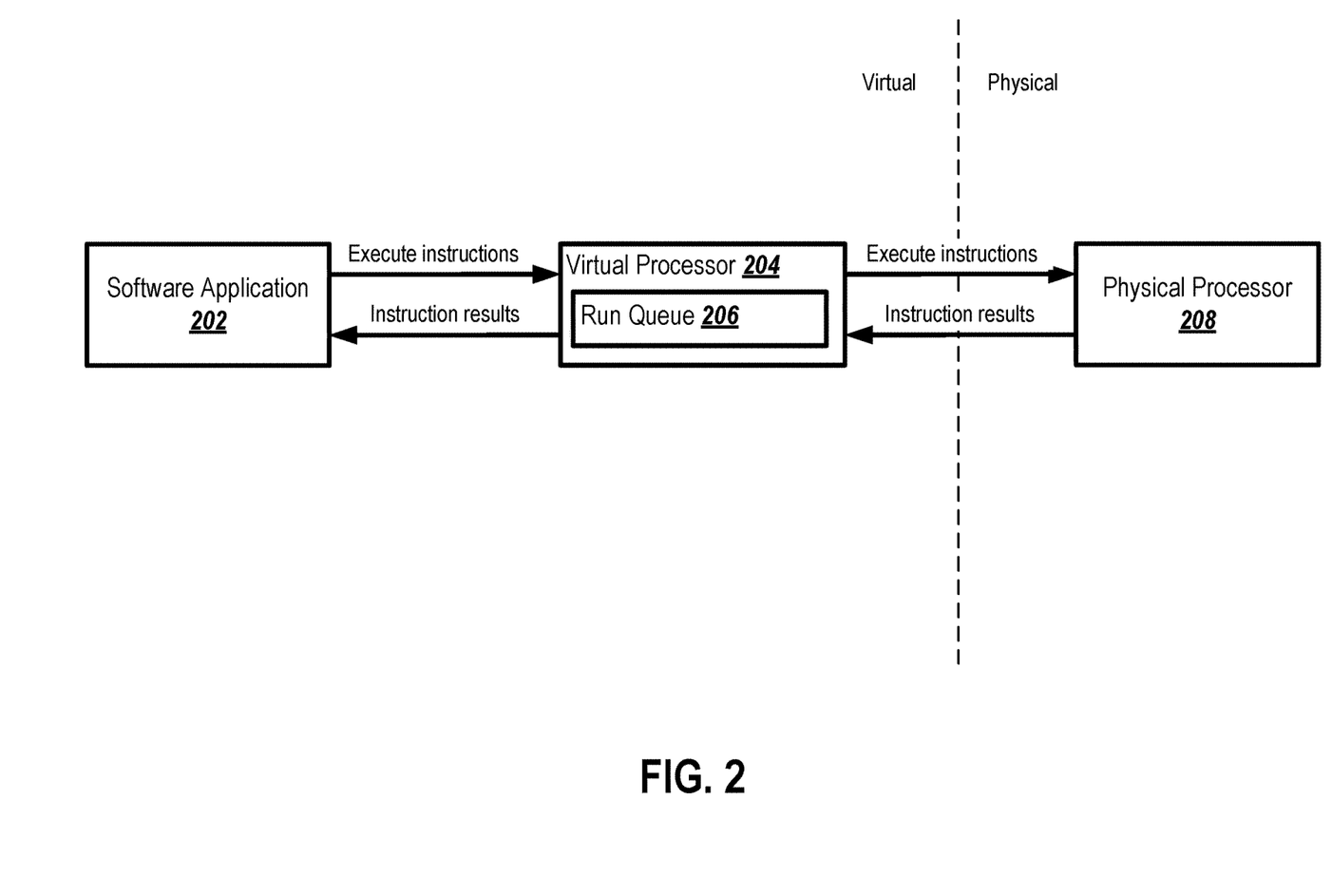
FIG. 2 is a block diagram of a system configuration showing information flow between a software application executing in a virtual machine instance, a virtual processor, and a physical processor.

FIG. 2 is a block diagram of a system configuration 200 showing information flow between a software application 202 executing in a virtual machine instance, a virtual processor 204, and a physical processor 208. The software application 202 instructs the virtual processor 204 execute instructions. The virtual processor 204 then interacts with the physical processor 208 to execute their request instructions. The virtual processor 204 receives results of the execute instructions from the physical processor 208, and returns these instruction results to the software application 202.

The virtual processor 204 includes a run queue 206. The run queue 206 may be used by the virtual processor 204 to store references to threads of execution from the software application 202 until the physical processor 208 is available to execute the threads. For example, the physical processor 208 may be capable of executing a certain number of threads of execution at once. If the physical processor 208 is executing this certain number of instructions at a given time, it is not available execute additional threads. Threads requesting execution during this time may be stored in the run queue 206 until the physical processor becomes available. In some cases, the run queue 206 may be a first in first out (FIFO) queue configured such that threads will be sent to the physical processor in the order that they were received from the software application 202.

In some implementations, the virtual processor 204 may be operable to convert instructions received from the software application 202 into a format associated with physical processor 208. For example, the virtual processor 204 may receive instructions from the software application 202 in an instruction format associated with a particular processor manufacturer, and convert the instructions to a format of a different processor manufacturer associated with physical processor 208.

Figure 3:
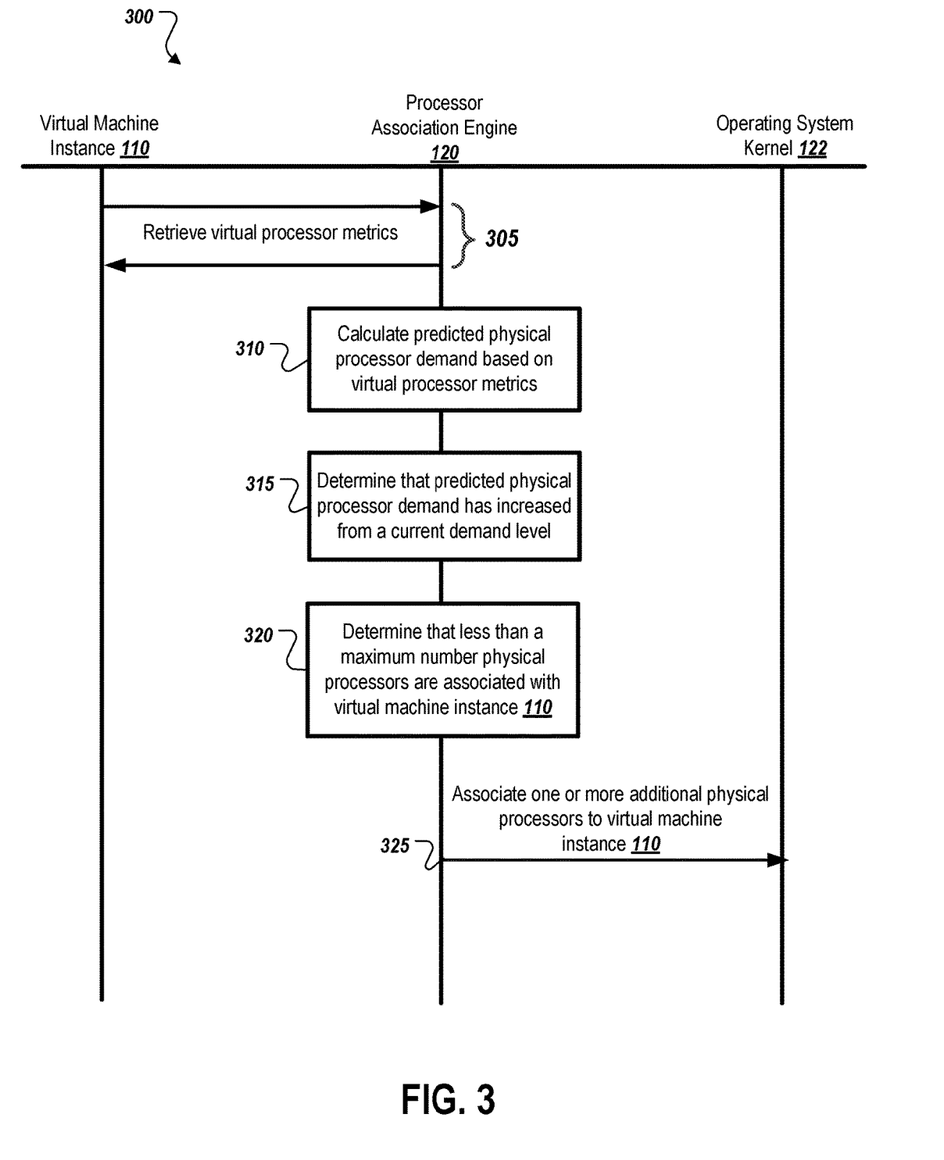
FIG. 3 is a message sequence diagram showing an example sequence for flexibly associating physical processors to a virtual machine instance based on predicted demand.

FIG. 3 is a message sequence diagram showing an example sequence 300 for flexibly associating physical processors to a virtual machine instance based on predicted demand. At 305, the processor association engine 120 retrieves virtual processor metrics from the virtual machine instance 110. In some cases, this retrieval may occur according to the techniques described relative to FIG. 1, according to other techniques.

At 310, the processor association engine 120 calculates the predicted physical processor demand based on the virtual processor metrics. For example, the processor association engine 120 may examine the run queue length for virtual processors associated with the virtual machine instance 110, and may produce a demand metric including the average number of waiting instructions for each virtual processor of the virtual machine instance 110.

At 315, the processor association engine 120 determines that less than the maximum number of physical processes are associated to the virtual machine instance 110. For example, the processor association engine 120 may determine that two physical processors are associated to the virtual machine instance 110, while the maximum number of physical processes available to be associated with the virtual machine instance 110 is four. In response to this determination, the processor association engine 120 may associate one or more additional physical processors to the virtual machine instance 110 by interacting with the operating system kernel 122 (325).

Figure 4:
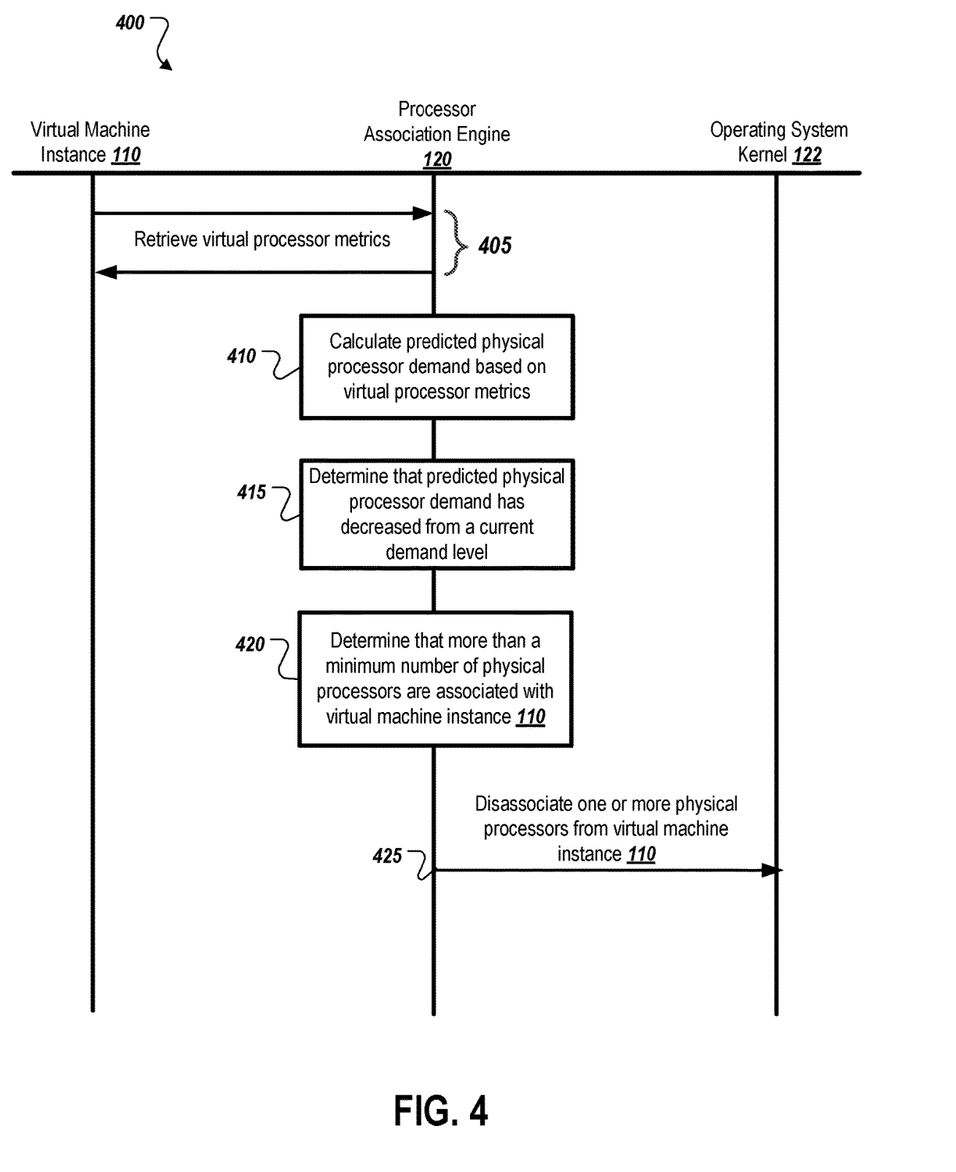
FIG. 4 is a message sequence diagram showing another example sequence for flexibly associating physical processors to a virtual machine instance based on predicted demand.

FIG. 4 is a message sequence diagram showing another example sequence for flexibly associating physical processors to a virtual machine instance based on predicted demand. At 405, the processor association engine 120 retrieves virtual processor metrics from the virtual machine instance 110. In some cases, this retrieval may occur according to the techniques described relative to FIG. 1, according to other techniques.

At 410, the processor association engine 120 calculates the predicted physical processor demand based on the virtual processor metrics. For example, the processor association engine 120 may examine the run queue length for virtual processors associated with the virtual machine instance 110, and may produce a demand metric including the average number of waiting instructions for each virtual processor of the virtual machine instance 110.

At 415, the processor association engine 120 determines that more than the minimum number of physical processes are associated to the virtual machine instance 110. For example, the processor association engine 120 may determine that four physical processors are associated to the virtual machine instance 110, while the minimum number of physical processes available to be associated with the virtual machine instance 110 is two. In response to this determination, the processor association engine 120 may disassociate one or more physical processors from the virtual machine instance 110 by interacting with the operating system kernel 122 (425).

Figure 5:
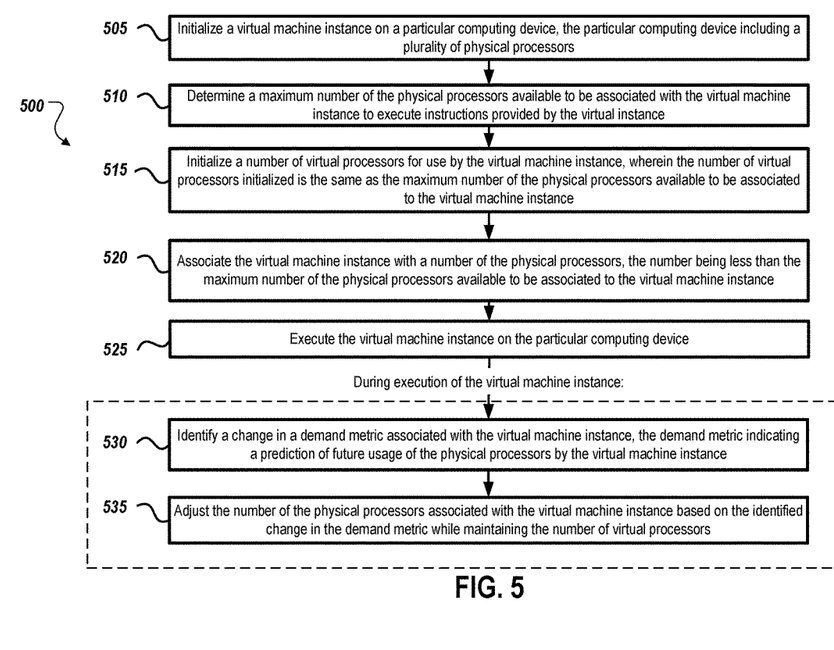
FIG. 5 is a flow diagram of an example process for flexible physical processor association for virtual machines.

FIG. 5 is a flow diagram of an example process for flexible physical processor association for virtual machine instances. At 505, a virtual machine instance is initialized on a particular computing device including a plurality of physical processors.

At 510, a maximum number of physical processes available to be associated with the virtual machine instance to execute instructions provided by the virtual machine instance is determined.

At 515, a number of virtual processors is initialized for use by the virtual machine instance. The number of virtual processors initialized is the same as the maximum number of physical processors available to be associated to the virtual machine instance.

At 520, the virtual machine instances associated with a number of the physical processors less than the maximum number of the physical processors available to be associated to the virtual machine instance.

At 525, the virtual machine instances executed on the particular computing device.

Actions 530 through 535 occur during execution of the virtual machine instance. At 530, a change in a demand metric associated with the virtual machine instance is identified. The demand metric indicates a prediction of future usage of the physical processors by the virtual machine instance. In some cases, the demand metric includes an average number of threads in run queues associated with each virtual processor, each run queue configured to store threads received from the virtual machine instance while the virtual processor is waiting for one of the physical processors associated with the virtual machine instance to be available to execute each thread.

At 535, the number of physical processes associated with the virtual machine instance is adjusted based on the identified change in the demand metric while maintaining the number of virtual processors. In some implementations, adjusting the number of the physical processors associated with the virtual machine instance based on the identified change in the demand metric includes determining that the change in the demand metric indicates a prediction of increased future usage of the physical processors by the virtual machine instance. In response to this determination, it may be determined that the number of physical processors associated with the virtual machine instance is less than the maximum number of the physical processors available to be associated with the virtual machine instance. In response, one or more additional physical processors may be associated with the virtual machine instance while maintaining the number of virtual processors.

Adjusting the number of the physical processors associated with the virtual machine instance based on the identified change in the demand metric while maintaining the number of virtual processors may also include determining that the change in the demand metric indicates a prediction of decreased future usage of the physical processors by the virtual machine instance, and in response, disassociating one or more physical processors from the virtual machine instance while maintaining the number of virtual processors.

Adjusting the number of the physical processors associated with the virtual machine instance based on the identified change in the demand metric while maintaining the number of virtual processors may also include determining that the change in the demand metric indicates a prediction of decreased future usage of the physical processors by the virtual machine instance, and determining that the number of the physical processors associated with the virtual machine instance is equal to a number of dedicated physical processors for the virtual machine instance. In response, the number of physical processors associated with the virtual machine instance may be maintained while maintaining the number of virtual processors.

In some implementations, adjusting the number of the physical processors associated with the virtual machine instance includes setting a physical processor affinity attribute of the virtual machine instance in an operating system executing on the computing device. In some cases, adjusting the number of the physical processors associated with the virtual machine instance may be performed without notifying one or more software applications executing within the virtual machine instance.

Figure 6:
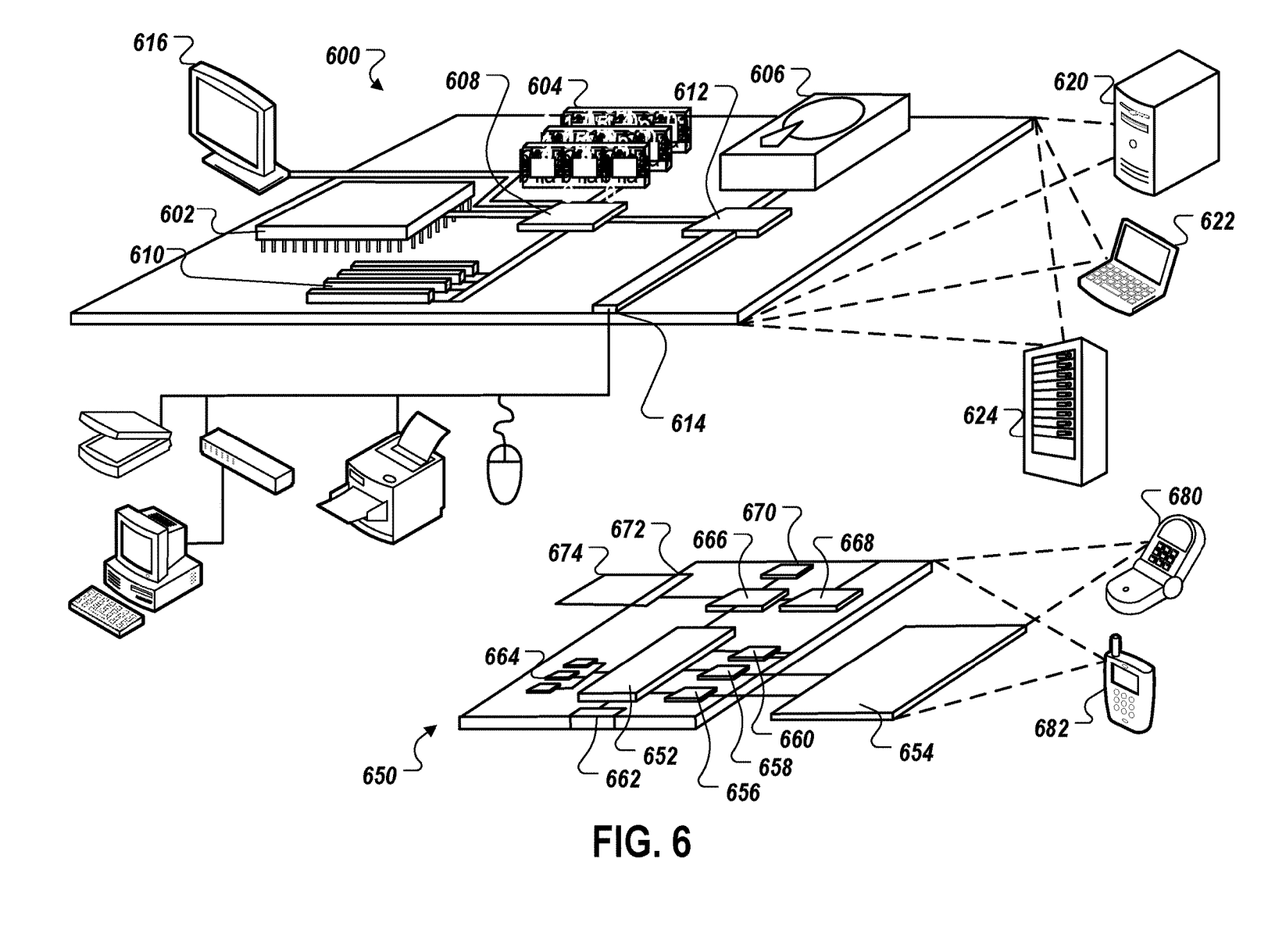
FIG. 6 is a block diagram of an example computing device.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed interface 608 manages bandwidth-intensive operations for the computing device 600, while the low speed interface 612 manages lower bandwidth-intensive operations. Such allocation of functions is exemplary only. In one implementation, the high-speed interface 608 is coupled to memory 604, display 616 (e.g., through a graphics processor or accelerator), and to high-speed expansion ports 610, which may accept various expansion cards (not shown). In the implementation, low-speed interface 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 652 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory 664 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a filesystem. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
   initializing a first number of virtual processors for use by a virtual machine instance on a particular computing device having a second number of physical processors available to be associated with the virtual machine instance to execute instructions provided by the virtual instance, wherein the physical processors comprise central processing units in the particular computing device;
   associating the virtual machine instance with a third number of the physical processors, the third number being less than the second number of the physical processors available to be associated with the virtual machine instance, wherein each of the virtual processors comprises a virtual representation of a physical processor and is configured to receive instructions for execution from the virtual machine instance and execute the received instructions using the physical processors that are associated with the virtual machine instance;
   executing the virtual machine instance on the particular computing device;
   during execution of the virtual machine instance:
      identifying a change in a demand metric associated with the virtual machine instance, the demand metric indicating a prediction of future usage of the physical processors by the virtual machine instance; and
      adjusting the third number of the physical processors associated with the virtual machine instance based on the identified change in the demand metric while maintaining the first number of virtual processors.

2. The method of claim 1, wherein the demand metric includes an average number of threads in run queues associated with each virtual processor, each run queue configured to store references to threads of the virtual machine instance while the virtual processor is waiting for one of the physical processors associated with the virtual machine instance to be available to execute each thread.

3. The method of claim 1, wherein adjusting the third number of the physical processors associated with the virtual machine instance based on the identified change in the demand metric while maintaining the first number of virtual processors includes:
   determining that the change in the demand metric indicates a prediction of increased future usage of the physical processors by the virtual machine instance;
   in response to determining that the change in the demand metric indicates a prediction of increased future usage of the physical processors by the virtual machine instance:
      determining that the third number of the physical processors associated with the virtual machine instance is less than the second number of the physical processors available to be associated with the virtual machine instance; and
      in response to determining that the third number of the physical processors associated with the virtual machine instance is less than the second number of the physical processors available to be associated with the virtual machine instance, associating one or more additional physical processors with the virtual machine instance while maintaining the first number of virtual processors.

4. The method of claim 1, wherein adjusting the third number of the physical processors associated with the virtual machine instance based on the identified change in the demand metric while maintaining the first number of virtual processors includes:
   determining that the change in the demand metric indicates a prediction of decreased future usage of the physical processors by the virtual machine instance; and
   in response to determining that the change in the demand metric indicates a prediction of decreased future usage of the physical processors by the virtual machine instance, disassociating one or more physical processors from the virtual machine instance while maintaining the first number of virtual processors.

5. The method of claim 1, wherein adjusting the third number of the physical processors associated with the virtual machine instance based on the identified change in the demand metric while maintaining the first number of virtual processors includes:
   determining that the change in the demand metric indicates a prediction of decreased future usage of the physical processors by the virtual machine instance;
   determining that the third number of the physical processors associated with the virtual machine instance is equal to a number of dedicated physical processors for the virtual machine instance; and
   in response to determining that the third number of the physical processors associated with the virtual machine instance is equal to the number of dedicated physical processors for the virtual machine instance, maintaining the third number of the physical processors associated with the virtual machine instance while maintaining the first number of virtual processors.

6. The method of claim 1, wherein adjusting the third number of the physical processors associated with the virtual machine instance includes setting a physical processor affinity attribute of the virtual machine instance in an operating system executing on the computing device.

7. The method of claim 1, wherein adjusting the third number of the physical processors associated with the virtual machine instance is performed without notifying one or more software applications executing within the virtual machine instance.

8. A non-transitory, computer-readable medium storing instructions operable when executed to cause at least one processor to perform operations comprising:
   initializing a first number of virtual processors for use by a virtual machine instance on a particular computing device having a second number of physical processors available to be associated with the virtual machine instance to execute instructions provided by the virtual instance, wherein the physical processors comprise central processing units in the particular computing device;
   associating the virtual machine instance with a third number of the physical processors, the third number being less than the second number of the physical processors available to be associated with the virtual machine instance, wherein each of the virtual processors comprises a virtual representation of a physical processor and is configured to receive instructions for execution from the virtual machine instance and execute the received instructions using the physical processors that are associated with the virtual machine instance;

executing the virtual machine instance on the particular computing device;

during execution of the virtual machine instance:

identifying a change in a demand metric associated with the virtual machine instance, the demand metric indicating a prediction of future usage of the physical processors by the virtual machine instance; and adjusting the third number of the physical processors associated with the virtual machine instance based on the identified change in the demand metric while maintaining the first number of virtual processors.

9. The computer-readable medium of claim 8, wherein the demand metric includes an average number of threads in run queues associated with each virtual processor, each run queue configured to store references to threads of the virtual machine instance while the virtual processor is waiting for one of the physical processors associated with the virtual machine instance to be available to execute each thread.

10. The computer-readable medium of claim 8, wherein adjusting the third number of the physical processors associated with the virtual machine instance based on the identified change in the demand metric while maintaining the first number of virtual processors includes:

determining that the change in the demand metric indicates a prediction of increased future usage of the physical processors by the virtual machine instance;

in response to determining that the change in the demand metric indicates a prediction of increased future usage of the physical processors by the virtual machine instance:

determining that the third number of the physical processors associated with the virtual machine instance is less than the second number of the physical processors available to be associated with the virtual machine instance; and in response to determining that the third number of the physical processors associated with the virtual machine instance is less than the second number of the physical processors available to be associated with the virtual machine instance, associating one or more additional physical processors with the virtual machine instance while maintaining the first number of virtual processors.

11. The computer-readable medium of claim 8, wherein adjusting the third number of the physical processors associated with the virtual machine instance based on the identified change in the demand metric while maintaining the first number of virtual processors includes:

determining that the change in the demand metric indicates a prediction of decreased future usage of the physical processors by the virtual machine instance; and in response to determining that the change in the demand metric indicates a prediction of decreased future usage of the physical processors by the virtual machine instance, disassociating one or more physical processors from the virtual machine instance while maintaining the first number of virtual processors.

12. The computer-readable medium of claim 8, wherein adjusting the third number of the physical processors associated with the virtual machine instance based on the identified change in the demand metric while maintaining the first number of virtual processors includes:

determining that the change in the demand metric indicates a prediction of decreased future usage of the physical processors by the virtual machine instance;

determining that the third number of the physical processors associated with the virtual machine instance is equal to a number of dedicated physical processors for the virtual machine instance; and in response to determining that the third number of the physical processors associated with the virtual machine instance is equal to the number of dedicated physical processors for the virtual machine instance, maintaining the third number of the physical processors associated with the virtual machine instance while maintaining the first number of virtual processors.

13. The computer-readable medium of claim 8, wherein adjusting the third number of the physical processors associated with the virtual machine instance includes setting a physical processor affinity attribute of the virtual machine instance in an operating system executing on the computing device.

14. The computer-readable medium of claim 8, wherein adjusting the third number of the physical processors associated with the virtual machine instance is performed without notifying one or more software applications executing within the virtual machine instance.

15. A system comprising:

memory for storing data; and one or more processors operable to access the memory and to perform operations comprising:

initializing a first number of virtual processors for use by a virtual machine instance on a particular computing device having a second number of physical processors available to be associated with the virtual machine instance to execute instructions provided by the virtual instance, wherein the physical processors comprise central processing units in the particular computing device;

associating the virtual machine instance with a third number of the physical processors, the third number being less than the second number of the physical processors available to be associated with the virtual machine instance, wherein each of the virtual processors comprises a virtual representation of a physical processor and is configured to receive instructions for execution from the virtual machine instance and execute the received instructions using the physical processors that are associated with the virtual machine instance;

executing the virtual machine instance on the particular computing device;

during execution of the virtual machine instance:

identifying a change in a demand metric associated with the virtual machine instance, the demand metric indicating a prediction of future usage of the physical processors by the virtual machine instance; and adjusting the third number of the physical processors associated with the virtual machine instance based on the identified change in the demand metric while maintaining the first number of virtual processors.

16. The system of claim 15, wherein the demand metric includes an average number of threads in run queues associated with each virtual processor, each run queue configured to store references to threads of the virtual machine instance while the virtual processor is waiting for one of the physical processors associated with the virtual machine instance to be available to execute each thread.

17. The system of claim 15, wherein adjusting the third number of the physical processors associated with the virtual machine instance based on the identified change in the demand metric while maintaining the first number of virtual processors includes:
- determining that the change in the demand metric indicates a prediction of increased future usage of the physical processors by the virtual machine instance;
- in response to determining that the change in the demand metric indicates a prediction of increased future usage of the physical processors by the virtual machine instance:
  - determining that the third number of the physical processors associated with the virtual machine instance is less than the second number of the physical processors available to be associated with the virtual machine instance; and
  - in response to determining that the third number of the physical processors associated with the virtual machine instance is less than the second number of the physical processors available to be associated with the virtual machine instance, associating one or more additional physical processors with the virtual machine instance while maintaining the first number of virtual processors.

18. The system of claim 15, wherein adjusting the third number of the physical processors associated with the virtual machine instance based on the identified change in the demand metric while maintaining the first number of virtual processors includes:
- determining that the change in the demand metric indicates a prediction of decreased future usage of the physical processors by the virtual machine instance; and
- in response to determining that the change in the demand metric indicates a prediction of decreased future usage of the physical processors by the virtual machine instance, disassociating one or more physical processors from the virtual machine instance while maintaining the first number of virtual processors.

19. The system of claim 15, wherein adjusting the third number of the physical processors associated with the virtual machine instance based on the identified change in the demand metric while maintaining the first number of virtual processors includes:
- determining that the change in the demand metric indicates a prediction of decreased future usage of the physical processors by the virtual machine instance;
- determining that the third number of the physical processors associated with the virtual machine instance is equal to a number of dedicated physical processors for the virtual machine instance; and
- in response to determining that the third number of the physical processors associated with the virtual machine instance is equal to the number of dedicated physical processors for the virtual machine instance, maintaining the third number of the physical processors associated with the virtual machine instance while maintaining the first number of virtual processors.

20. The method of claim 1, wherein all of the physical processors are included in the particular computing device and the virtual machine instance is a single virtual machine instantiated on the particular computing device.

* * * * *